United States Patent [19]

Lee

[11] Patent Number: 5,862,261
[45] Date of Patent: Jan. 19, 1999

[54] CURRENT FRAME PREDICTION METHOD AND APPARATUS FOR USE IN AN IMAGE SIGNAL ENCODING SYSTEM

[75] Inventor: Min-Sup Lee, Seoul, Rep. of Korea

[73] Assignee: Daewoo Electronics Co., Ltd., Seoul, Rep. of Korea

[21] Appl. No.: 853,945

[22] Filed: May 9, 1997

[30] Foreign Application Priority Data

May 9, 1996 [KR] Rep. of Korea ....................... 96-15267

[51] Int. Cl.$^6$ .................................................. G06K 9/46
[52] U.S. Cl. .......................................................... 382/236
[58] Field of Search ................................. 382/232, 236, 382/238, 239; 348/402, 411, 412, 413, 416, 420, 452, 699, 700, 701

[56] References Cited

U.S. PATENT DOCUMENTS 5,450,133  9/1995  Herpez et al. ........................... 348/452
5,502,492  3/1996  Jung ........................................ 348/413

Primary Examiner—Jose L. Couso
Attorney, Agent, or Firm—Pennie & Edmonds, LLP

[57] ABSTRACT

An apparatus for predicting a current frame signal included in an image signal based on a reference frame first detects a panning vector representing a spatial displacement between the current and the reference frames. Once the panning vector is detected, a predicted frame containing a substitutable region and an unsubstitutable region is determined based on the panning vector and the reference frame, and then an amplitude of the panning vector is compared with a reference value. Subsequently, a predicted current frame signal is generated as the result of the current frame prediction process in response to the result of the comparison. If the amplitude of the panning vector is smaller than the reference value, the predicted current frame signal is produced by padding pixel values of the substitutable region which are located along a boundary between the substitutable region and the unsubstitutable region into the unsubstitutable region. Meanwhile, if the amplitude of the panning vector is greater than or equal to the reference value, the predicted current frame signal is created by using a block matching technique for the unsubstitutable region based on the current and the reference frame signals.

16 Claims, 5 Drawing Sheets

5,862,261

CURRENT FRAME PREDICTION METHOD AND APPARATUS FOR USE IN AN IMAGE SIGNAL ENCODING SYSTEM

FIELD OF THE INVENTION

The present invention relates to an image signal encoding method and apparatus; and, more particularly, to a method and apparatus for predicting a current frame signal to reduce the amount of data to be transmitted.

DESCRIPTION OF THE PRIOR ART

As is well known, transmission of digitized image signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amount of digital data therethrough, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse coded modulation), two-dimensional DCT(discrete cosine transform), quantization of DCT coefficients, and VLC(variable length coding). The motion compensated DPCM is a process of estimating the movement of an object between a current frame and a previous frame or a future frame, i.e., a reference frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", IEEE Transactions on Communications, COM-+b 33, No. 12 (December 1985); and in Ninomiya and Ohtsuka, "A Motion-Compensated Interframe Coding Scheme for Television Pictures", IEEETransactions on Communications, COM-+b 30, No. 1 (January 1982).

The two-dimensional DCT, which reduces or makes use of spatial redundancies between image data, converts a block of digital image data, for example, a block of 8×8 pixels, into a set of transform coefficient data. This technique is described in Chen and Pratt, "Scene Adaptive Coder", IEEETransactions on Communications, COM-+b 32, No. 3 (March 1984). By processing such transform coefficient data with a quantizer, zigzag scanning, and VLC, the amount of data to be transmitted can be effectively compressed.

Specifically, in the motion compensated DPCM, a current frame signal is predicted from the corresponding reference frame signal based on an estimation of the motion between the current and the reference frames. Such estimated motion may be described in terms of two dimensional motion vectors representing the displacement of pixels between the reference and the current frames.

There have been two basic approaches to estimate the displacement of pixels of an object: one is a block-by-block estimation and the other is a pixel-by-pixel approach.

In the block-by-block motion estimation, a block in a current frame is compared with blocks in its reference frame until a best match is determined. From this, an interframe displacement vector (which indicates how much the block of pixels has moved between frames) for the whole block can be estimated for the current frame being transmitted.

Such block matching technique may be employed in predicting P and B frames included in frame sequences, as disclosed in *ITU Telecommunication Standardization Sector Study Group* 15, *Working Party* 15/1 *Expert's Group on Very Low Bit Rate Visual Telephony*, "Video Codec Test Model, TMN4 Rev1", (Oct. 25, 1994), wherein a P or predictive frame denotes a frame which is predicted from its previous frame (as the reference frame) while a B or bidirectionally predictive frame is predicted from its previous and future frames (as the reference frame). In coding the so-called B frame, in particular, a bidirectional motion estimation technique is employed in order to derive forward and backward displacement vectors, wherein the forward displacement vector is obtained by estimating the movement of an object between a B frame and its previous intra(I) or predictive(P) frame (as the reference frame) and the backward displacement vector is derived based on the B frame and its future I or P frame (as the reference frame).

In the block matching technique, to determine a motion vector for each search block in the current frame, a similarity calculation is performed between the search block of the current frame and each of a plurality of equal-sized candidate blocks included in a generally larger search region within the reference frame. An error function such as the mean absolute error or mean square error is used to carry out a similarity measurement between the search block of the current frame and one of the candidate blocks in the search region. And a motion vector, by definition, represents the displacement between the search block and a candidate block which yields a minimum "error" or difference. Each of the motion vectors is coded and then transmitted by a transmitter incorporating the motion compensated coding scheme through the transmission channel to a receiver which reconstructs the current frame through the use of the transmitted motion vectors.

In the motion compensated DPCM, it may happen that a motion in the frame sequence is localized or focalized upon an object with most of its surroundings or background stationary, or that the motion is simply translational, e.g., as in case of a camera panning. In such event, there may be little difference between the actual and the predicted values of the frame sequence. Consequently, there may exist a number of motion vectors with an identical displacement. Since, however, in the motion compensated coding scheme, all of the motion vectors are coded before being transmitted, including the motion vectors with an identical displacement, which tends to lower the efficiency of the data compression system.

SUMMARY OF THE INVENTION

It is, therefore, a primary object of the present invention to provide a method and apparatus for predicting a current frame signal, to thereby enhance the data compression efficiency of the digital image compression system.

In accordance with one aspect of the invention, there is provided a method, for use in an image signal encoding system, for generating a predicted current frame signal based on a current frame and a reference frame, wherein the current and the reference frames are included in an image signal having a sequence of frames, comprising the steps of: (a) detecting a panning vector representing a spatial displacement between the current and the reference frames; (b)

determining a predicted frame containing a substitutable region and an unsubstitutable region based on the panning vector and the reference frame, wherein the substitutable region has pixel values selected from the reference frame and the unsubstitutable region has none of pixel values; (c) comparing a reference value with an amplitude of the panning vector; and (d) generating the predicted current frame signal according to the result of the step (c) based on the predicted frame and the current and the reference frames, the step (d) includes the steps of: (d1) producing, if the amplitude of the panning vector is smaller than the reference value, the predicted current frame signal by padding pixel values of the substitutable region which are located along a boundary between the substitutable region and the unsubstitutable region into the unsubstitutable region; and (d2) creating, if the amplitude of the panning vector is greater than or equal to the reference value, the predicted current frame signal by using a block matching technique for the unsubstitutable region based on the current and the reference frame signals.

In accordance with another aspect of the invention, there is provided an apparatus, for use in an image signal encoding system, for generating a predicted current frame signal based on a current frame and a reference frame, wherein the current and the reference frames are included in an image signal having a sequence of frames, which comprises: a panning vector determination circuit for detecting a panning vector representing a spatial displacement between the current and the reference frames; a predicted frame generator for determining a predicted frame containing a substitutable region and an unsubstitutable region based on the panning vector and the reference frame, wherein the substitutable region has pixel values selected from the reference frame and the unsubstitutable region has none of pixel values; a selection controller for providing selection information by comparing a reference value with an amplitude of the panning vector; a first prediction circuit for generating a first predicted current frame signal by padding pixel values within the substitutable region into the unsubstitutable region within the predicted frame; a second prediction circuit for producing a second predicted current frame signal by using a block matching technique for the unsubstitutable region based on the panning vector and the current and reference frame signals; and a selector for choosing, in response to the selection information, either the first predicted current frame signal or the second predicted current frame signal as the predicted current frame signal.

BRIEF DESCRIPTION OF THE DRAWINGS

The foregoing and other objects, features and advantages of the present invention will become apparent from the following detailed description of preferred embodiments of the invention with reference to the accompanying drawings, in which.

DETAILED DESCRIPTION OF THE PREFERRED EMBODIMENTS

Figure 1:
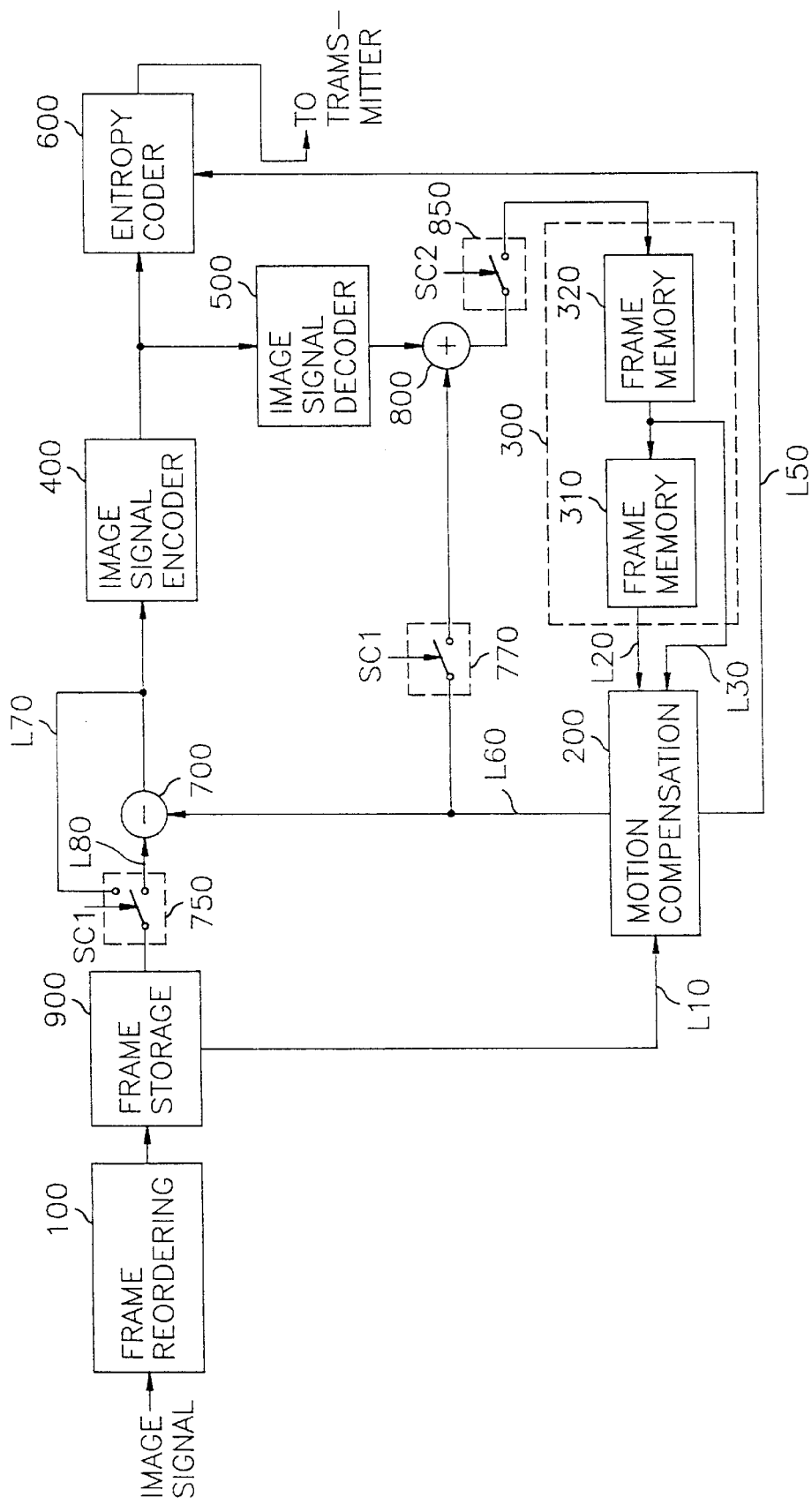
FIG. 1 shows an image encoding system in accordance with the present invention.
Figure 7:
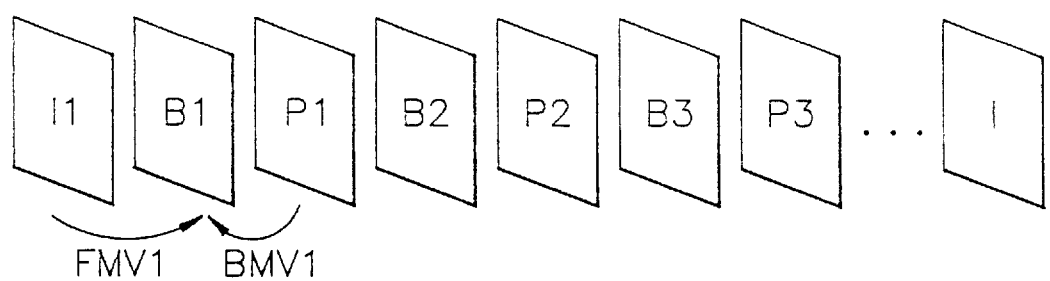
FIG. 7 is a schematic diagram showing a frame sequence.

Referring to FIG. 1, there is shown a block diagram of an image encoding system in accordance with the present invention and an input image signal is supplied to a frame reordering unit 100. As exemplarily shown in FIG. 7, the input image signal consists of a frame sequence which is provided with one intra(I) frame, I1, three bidirectionally predictive(B) frames, B1, B2, B3, and three predictive(P) frames, P1, P2, P3 and, therefore, the frame sequence including I1, B1, P1, B2, P2, B3, P3 is applied to the frame reordering unit 100 which is adapted to reorder the frame sequence into a reordered image signal of, e.g., I1, P1, B1, P2, B2, P3, B3 in order to derive bidirectionally predicted frame signals for the B frames. The reordered image signal is then provided to a frame storage unit 900 on a frame-by-frame basis.

The frame storage unit 900 stores each frame signal fed thereto; provides a motion compensation unit 200 with the frame signal stored therein as a current frame signal via a line L10; and also supplies the current frame signal to a first switch 750 on a block-by-block basis, the current frame being divided into a plurality of blocks having N×M pixel values with N and M being positive integers, respectively.

As shown in FIG. 1, the image coding system includes the first, a second, and a third switches 750, 770, and 850 which are actuated according to frame coding modes. The first and the second switches 750 and 770 are actuated by a first frame mode control signal SC1 from a conventional system controller, e.g., a microprocessor(not shown), in order to selectively perform two frame coding modes, i.e., an intra frame coding mode and an inter frame coding mode. Thereafter, the first switch 750 is connected to a line L70 in the intra frame coding mode and attached to a line L80 in the inter frame coding mode. And, the second switch 770 is open in the intra frame coding mode and closed in the inter frame coding mode depending on the first frame mode control signal SC1. Meanwhile, the operation of the third switch 850 is performed in response to a second frame mode control signal SC2. If the current frame is a P or I frame, the third switch 850 is closed and it is open when the current frame is a B frame. Since the switches 750, 770, and 850 operate as shown in the above illustration, hereinafter, the connections of the switches will not be explained in detail.

In the intra frame coding mode, the intra frame signal, e.g., I1 frame signal, retrieved from the frame storage unit 900 is directly coupled to an image signal encoder 400 as the current frame signal via the line L70.

At the image signal encoder 400, the current frame signal is encoded into a set of quantized transform coefficients, e.g., by using a discrete cosine transform (DCT) and any of the known quantization methods. Then, the quantized transform coefficients are transmitted to an entropy coder 600 and an image signal decoder 500.

At the entropy coder 600, the quantized transform coefficients from the image signal encoder 400 are coded together by using, e.g., a variable length coding technique; and transmitted to a transmitter(not shown) for the transmission thereof as an encoded image signal.

In the meantime, the image signal decoder 500 converts the quantized transform coefficients from the image signal encoder 400 back to a reconstructed intra frame signal by employing an inverse quantization and an inverse discrete cosine transform. The reconstructed intra frame signal from the image signal decoder 500 are then stored as a reference frame signal in a memory unit 300, wherein the memory unit 300 includes two frame memories 310 and 320, which are connected to the motion compensation unit 200 via lines L20 and L30, respectively.

In the inter frame coding mode, i.e., when the current frame is a predictive frame, the current frame signal is provided from the frame storage unit 900 to the motion compensation unit 200 via the line L10 on a frame-by-frame basis and supplied via the first switch 750 to a subtractor 700 on the block-by-block basis.

At the motion compensation unit 200, the current frame signal, i.e., the predictive frame is predicted based on the reference frame signal stored in the memory unit 300 to thereby produce a predicted current frame signal. In the prediction process, as aforementioned, a P frame is predicted from its previous frame while a B frame is predicted from its previous and future frames. For example, if the current frame is a P1 frame, its previous frame, i.e., the I1 frame in the reordered image signal is used as the reference frame. On the other hand, if the current frame is a B1 frame, its previous and future frames, i.e., the I1 and P1 frames are used as the reference frame.

Figure 2:
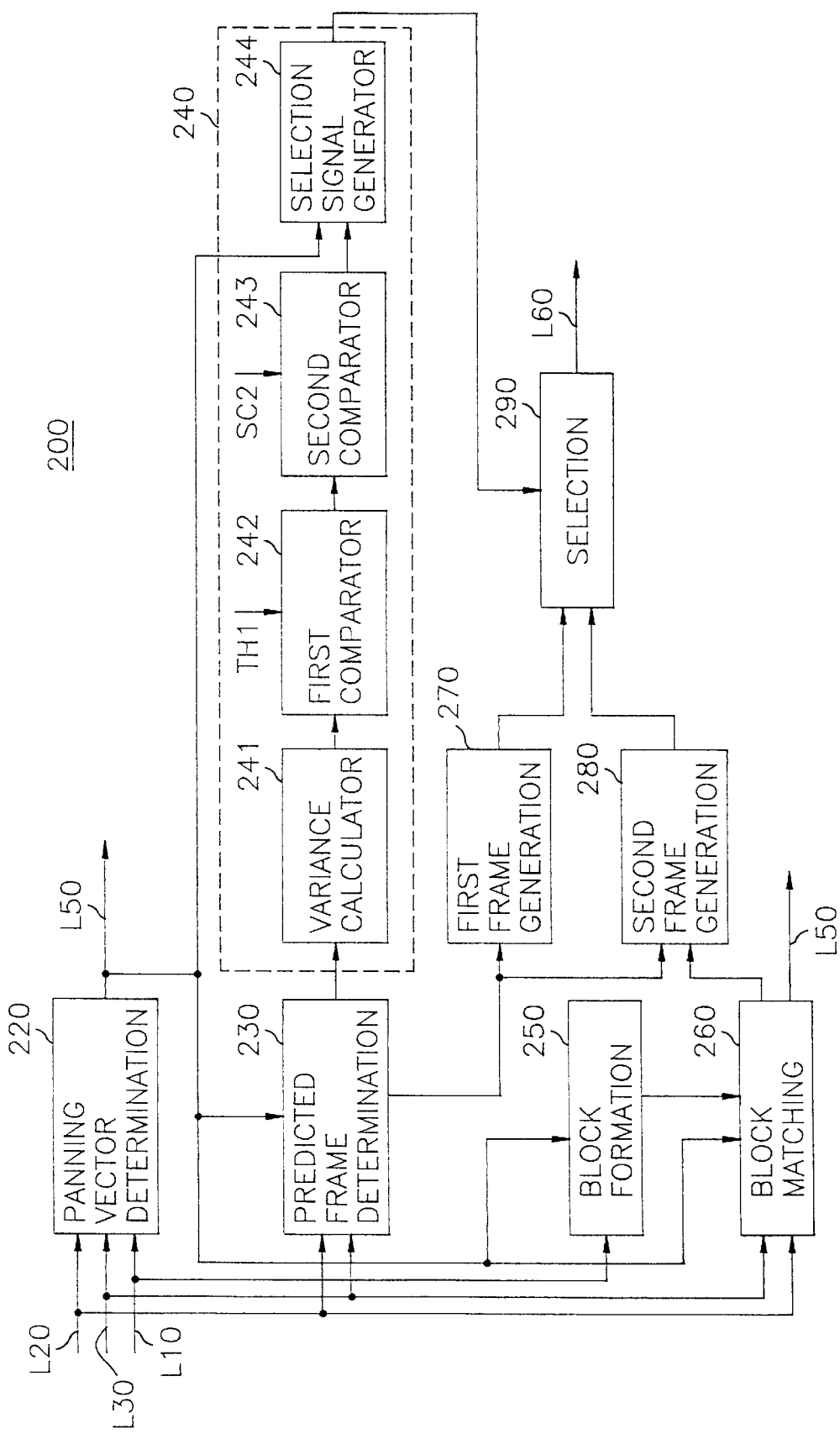
FIG. 2 is a detailed block diagram of a motion compensation unit in accordance with the present invention shown in FIG. 1.

Referring to FIG. 2, there is shown a detailed block diagram of the motion compensation unit 200 in accordance with the present invention, which includes a panning vector determination sector 220, a predicted frame determination sector 230, a selection control sector 240, a block formation sector 250, a block matching sector 260, a first and a second frame generation sectors 270 and 280, and a selection sector 290. Hereinafter, the operation of each of the devices constituting the motion compensation unit 200 will be explained.

First of all, the current frame signal retrieved from the frame storage unit 900 via the line L10 is coupled to the panning vector determination sector 220 and the block formation sector 250. And, the reference frame signal transferred from the memory unit 300 through the line L20 and/or line L30 is inputted to the panning vector determination sector 220, the predicted frame determination sector 230 and the block matching sector 260.

At the panning vector determination sector 220, a panning vector is detected by shifting the reference frame along the current frame until a shifted reference frame which is best-matched with the current frame is found, wherein the panning vector represents a spatial displacement between the current and the best-matched shifted reference frames. The spatial displacement between the best-matched shifted reference frame and the current frame which yields a minimum error or difference between the corresponding pixel values in an overlapped area thereof is determined as the panning vector of the current frame. The error is defined as the mean absolute error or mean square error which is used to carry out a similarity measurement between the reference and the current frames.

Figure 3:
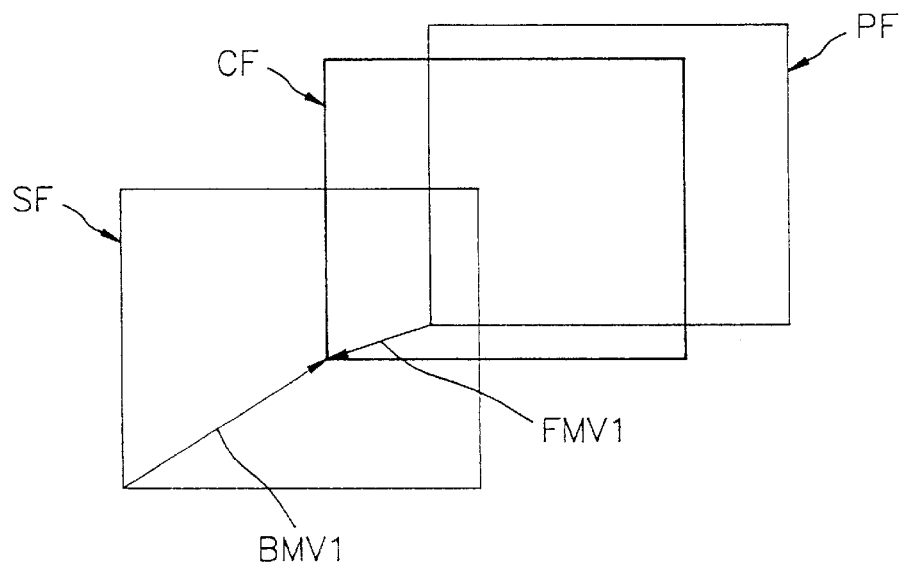
FIG. 3 represents three succeeding frames following a motion flow therebetween.

For instance, as shown in FIG. 3, in the above process, if the current frame CF is a P frame, the spatial displacement FMV1 between the current frame CF and the previous frame PF is detected as the panning vector of the current frame CF. Or, if a B frame is inputted as the current frame, of a backward displacement vector BMV1 and a forward displacement vector FMV1, the displacement vector corresponding to a frame having a smaller error is determined as the panning vector of the current frame CF, wherein the BMV1 represents a spatial displacement between the current frame CF and its future frame SF while the FMV1 shows a spatial displacement between the current frame CF and its previous frame PF. Hereinafter, for the purpose of the simplicity of the explanation, it is assumed that the FMV1 is determined as the panning vector for the current frame CF. The panning vector FMV1 derived at the sector 220 is provided onto a line L50 and fed to the predicted frame determination sector 230, the block formation sector 250, the block matching sector 260, and the selection control sector 240.

Figure 4:
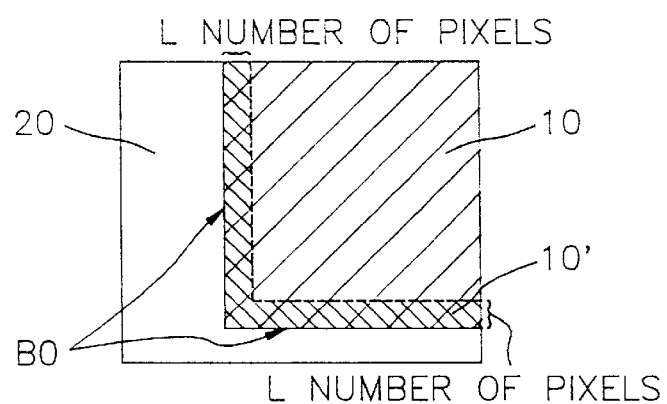
FIG. 4 illustrates a process of determining a reference value.

As described in FIG. 4, the predicted frame determination sector 230 generates a predicted frame containing a "substitutable region" and an "unsubstitutable region" by shifting the reference frame, i.e., the previous frame PF by the panning vector FMV1. The "substitutable region"(as referred to hereinafter and designated by 10) means a region corresponding to a part of the current frame which is covered by the reference frame. While the "unsubstitutable region" (as referred to hereinafter and designated by 20) means a region corresponding to a part of the current frame which is not covered by the reference frame. The substitutable region 10 contains pixel values retrieved from the previous frame PF while the unsubstitutable region 20 does not contain any pixel value determined. And also, there is a boundary B0 between the substitutable region 10 and the unsubstitutable region 20. The predicted frame is transferred to the selection control sector 240, the first frame generation sector 270 and the second frame generation sector 280.

The selection control sector 240 has a variance calculator 241, a first and a second comparators 242 and 243, and a selection signal generator 244 as represented in FIG. 2. The predicted frame transferred from the predicted frame determination sector 230 is fed to the variance calculator 241.

Referring back to FIG. 4, the variance calculator 241 ciphers a variance of pixel values included in a boundary region 10' within the substitutable region 10, wherein the boundary region 10' represents a gap between the substitutable region 10 and a region which is formed by shifting the boundary B0 to the substitutable region 10 by L number of pixels, both in horizontal and vertical directions, L being a positive integer. The variance is determined as follows:

$$\sigma_D^2 = \frac{1}{K} \sum_{i=1}^{K} (D_i - \overline{D_M})^2 \qquad \text{EQ. 1}$$

wherein $\sigma_D^2$ represents the variance of pixel values; $D_i$ denotes a pixel value included in the boundary region 10'; $\overline{D_M}$ is a mean value of the pixel values contained in the boundary region 10'; and K is the number of pixels within the boundary region 10'.

The variance is compared with a predetermined threshold value TH1 at the first comparator 242 to thereby generate a first or a second comparison signal to the second comparator 243. If the variance is greater than or equal to the predetermined threshold value TH1, the first comparison signal COM1 is produced and, if otherwise, the second comparison signal COM2 is outputted. Depending on the value of the variance, either the comparison signal COM1 or COM2 can be used as a measure to determine the complexity of the pixel value distribution of the boundary region 10'. That is, it is noted that, when the first comparison signal COM1 is generated, the complexity of the pixel value distribution of the boundary region 10' is higher than the case of the second comparison signal COM2.

The second comparator 243 determines, in response to the second frame mode control signal SC2 produced in accordance with the frame type(FT) of the current frame, i.e., a P or B frame, a reference value as exemplarily shown in

[TABLE 1] based on the first or the second comparison signal.

TABLE 1

| FT | COM | |
|---|---|---|
|  | COM1 | COM2 |
| P | 3 | 6 |
| B | 2 | 4 |

As illustrated in [TABLE 1], the reference value of a P frame is larger than that of a B frame and the reference value increases as the variance value decreases, i.e., the reference value of COM2 is greater than that of COM1. Therefore, in the above case the current frame is a P frame, values located at the second row in [TABLE 1] are selected and the reference value is determined in response to the comparison signal COM1 or COM2.

The reference value selected from [TABLE 1] is inputted to the selection signal generator 244 and compared with the amplitude of the panning vector FMV1 retrieved from the panning vector determination sector 220 in order to provide a first or a second selection signal SS1 or SS2 to the selection sector 290. The first selection signal SS1 is generated if the amplitude of the panning vector is larger than or equal to the reference value and the second selection signal SS2 is produced if otherwise.

Figure 5:
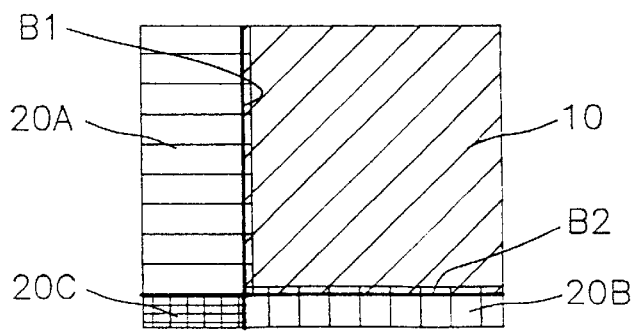
FIG. 5 depicts a boundary padding process in accordance with the present invention.

In the meantime, in accordance with the embodiment of the present invention, the first frame generation sector 270 produces a first predicted current frame signal based on the predicted frame signal delivered from the predicted frame determination sector 230. Referring to FIG. 5, there is provided the first predicted current frame consisting of padding regions 20A, 20B and 20C and the substitutable region 10. Hereupon, the first padding region 20A is determined by horizontally padding each of pixel values positioned along the vertical boundary B1 to the unsubstitutable region 20 in FIG. 4 and the second padding region 20B is determined by vertically padding each of pixel values positioned along the horizontal boundary B2. On the other hand, the third padding region 20C is filled with a pixel value determined by averaging pixel values of low side of the first padding region 20A and pixel values of left side of the second padding region 20B. The first predicted current frame signal is inputted to the selection sector 290.

In the above processes, the block formation sector 250 detects search blocks to be used for carrying out a block matching process based on the padding vector FMV1 from the panning vector determination sector 220 and the current frame signal coupled via the line L10.

The block matching sector 260 detects motion vectors corresponding to the search blocks and pixel values filling the unsubstitutable region 20 within the predicted frame in FIG. 4 based on the reference frame signal from the memory unit 300.

Figure 6A:
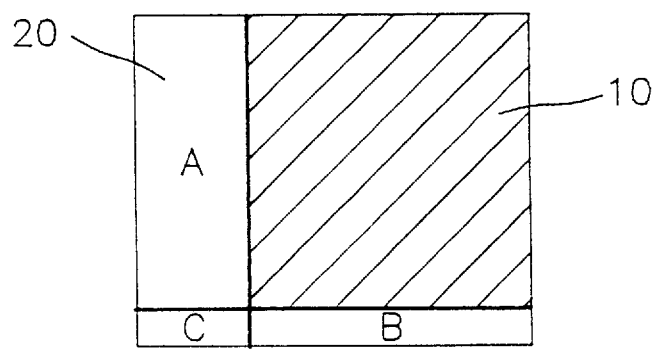
FIGS. 6A and 6B describe motion vector detecting processes for a unsubstitutable region within a predicted frame in accordance with the embodiments of the present invention.
Figure 6B:
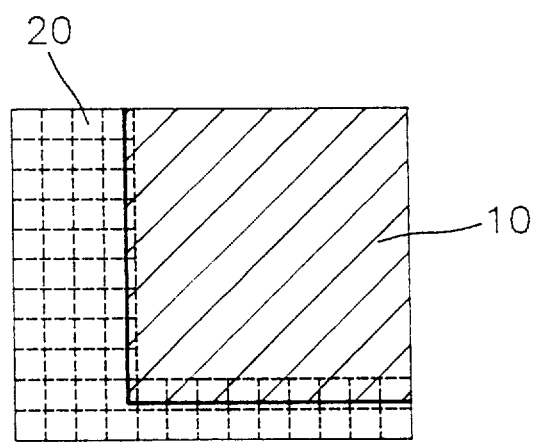

Referring to FIGS. 6A and 6B, there are shown motion vector detecting processes for the region 20 within the predicted frame in FIG. 4.

In accordance with an embodiment of the present invention, the unsubstitutable region 20 is divided into several regions, e.g., A, B and C as shown in FIG. 6A, whose sizes may not be identical. A search block corresponding to each of the regions A, B and C is selected from the current frame, wherein the locations of each of the regions and the corresponding search block are identical in a frame. The search blocks for the regions A, B and C are sequentially coupled to the block matching sector 260.

On the other hand, in accordance with another embodiment of the present invention, the unsubstitutable region 20 is represented by a plurality of equal-sized search blocks covering the unsubstitutable region 20 as shown in FIG. 6B, wherein each of the search blocks contains H×V pixel values with H and V being positive integers, respectively. The equal-sized search blocks are detected from the current frame in the similar manner as used in FIG. 6A. The equal-sized search blocks are transferred to the block matching sector 260 on a block-by-block basis.

The block matching sector 260 performs a block matching process by using a known block matching technique based on the search blocks derived from the block formation sector 250 and the reference frame signal from the memory unit 300 to thereby find motion vectors corresponding to the search blocks. Once the motion vectors are detected, the sector 260 produces a compensated unsubstitutable region covered by pixel values which are determined by the motion vectors based on the reference frame signal. In case the block matching process is for a B frame, if the panning vector is determined by a previous frame of the B frame, the block matching process should be performed based on a future frame of the B frame since the reference frame corresponding to the B frame contains the previous and future frames. The converses are also true. The motion vectors detected as above is outputted onto the line L50 and the compensated unsubstitutable region is transferred to the second frame generation sector 280.

At the second frame generation sector 280, the predicted frame signal provided from the predicted frame determination sector 230 and the compensated unsubstitutable region are combined so as to supply a second predicted current frame signal to the selection sector 290. At this time, if there exists an overlapped area between the substitutable region within the predicted frame and the compensated unsubstitutable region, then in the overlapped area, the pixel values from the compensated unsubstitutable region is discarded.

The selection sector 290 chooses either the first predicted current frame signal or the second predicted current frame signal in response to the selection signal derived from the selection signal generator 244 to thereby provide the selected frame signal onto a line L60 as the predicted current frame signal. If the first selection signal SS1 is inputted to the selection sector 290, the second predicted current frame signal is selected and, if otherwise, the first predicted current frame signal is chosen as the predicted current frame signal.

Referring back to FIG. 1, the predicted current frame signal is subtracted from the current frame signal on the line L80 at the subtractor 700 and the resultant data, i.e., an error signal denoting the differential pixel values is dispatched to the image signal encoder 400, wherein the error signal is encoded into a set of quantized transform coefficients, e.g., by using a DCT and any of the known quantization methods. Then, the quantized transform coefficients are transmitted to the entropy coder 600 and the image signal decoder 500.

At the entropy coder 600, the quantized transform coefficients are encoded together with the panning vector and motion vectors transferred from the motion compensation unit 200 via the line L50 in order to be transmitted to a transmitter(not shown) for the transmission thereof as an encoded image signal.

Meanwhile, the image signal decoder 500 converts the quantized transform coefficients to a reconstructed error signal by employing inverse quantization and inverse discrete cosine transform. The reconstructed error signal from the image signal decoder 500 and the predicted current frame signal on the line L60 from the motion compensation unit 200 are combined via the second switch 770 at an adder 800 to thereby provide a reconstructed frame signal. As beforementioned, the reconstructed frame signal is supplied via the third switch 850 to the memory unit 300 to be stored as the reference frame signal only if the current frame is either I or P frame. That is to say, if the current frame is a B frame, the reconstructed frame signal is abandoned.

The memory unit 300 includes, e.g., the two frame memories 310 and 320 which are connected in series as shown in FIG. 1. Therefore, the reconstructed frame signal from the adder 800 is first stored in, e.g., the first frame memory 320, and then provided to the motion compensation unit 200 via the line L30 as the reference frame signal and also shifted into the second frame memory 310 on a frame-by-frame basis if the next reconstructed frame signal from the adder 800 is inputted to the first frame memory 320. Thus, in the inter frame coding mode for a P frame, the reconstructed frame signal stored in the second frame memory 310 is transferred via the line L20 to the motion compensation unit 200 as the reference frame signal and, for a B frame, the reconstructed frame signals stored in the frame memories 310 and 320 are provided to the unit 200 as the reference frame signal through the lines L20 and L30, respectively.

The above processes are sequentially repeated as long as the image encoding operation is performed.

As illustrated above, in accordance with the present invention, the predicted current frame signal can be reconstructed by the differential signal from the subtractor 700, the panning vector and the motion vectors for the search blocks. Since the motion vectors are detected for only the unsubstitutable region within the predicted frame, the amount of data for transmitting the motion vectors can be reduced.

While the present invention has been described with respect to the particular embodiments, it will be apparent to those skilled in the art that various changes and modifications may be made without departing from the spirit and scope of the invention as defined in the following claims.

What is claimed is:

1. A method, for use in an image signal encoding system, for generating a predicted current frame signal based on a current frame and a reference frame, wherein the current and the reference frames are included in an image signal having a sequence of frames, comprising the steps of:
   (a) detecting a panning vector representing a spatial displacement between the current and the reference frames;
   (b) determining a predicted frame containing a substitutable region and an unsubstitutable region based on the panning vector and the reference frame, wherein the substitutable region has pixel values selected from the reference frame and the unsubstitutable region has none of pixel values;
   (c) comparing a reference value with an amplitude of the panning vector; and
   (d) generating the predicted current frame signal according to the result of the step (c) based on the predicted frame and the current and the reference frames, said step (d) includes the steps of:
      (d1) producing, if the amplitude of the panning vector is smaller than the reference value, the predicted current frame signal by padding pixel values of the substitutable region which are located along a boundary between the substitutable region and the unsubstitutable region into the unsubstitutable region; and
      (d2) creating, if the amplitude of the panning vector is greater than or equal to the reference value, the predicted current frame signal by using a block matching technique for the unsubstitutable region based on the current and the reference frame signals.

2. The method according to claim 1, wherein, when the current frame is a P or predictive frame, the current frame is predicted from its previous frame as the reference frame.

3. The method according to claim 1, wherein, when the current frame is a B or bidirectionally predictive frame, the current frame is predicted from its previous and future frames as the reference frame and the step (a) includes the steps of:
   (a1) detecting a forward displacement vector representing a spatial displacement between the current frame and its previous frame;
   (a2) finding a backward displacement vector representing a spatial displacement between the current frame and its future frame; and
   (a3) providing the displacement vector corresponding to the frame having a smaller error as the panning vector, wherein an error for the previous or the future frame is defined as the mean absolute error or mean square error used to carry out a similarity measurement between the current frame and the previous or the future frame.

4. The method according to claim 1, wherein the reference value is determined according to the steps of:
   (p1) calculating a variance of pixel values included in a boundary region within the substitutable region, wherein the boundary region represents a gap between the substitutable region and a region which is formed by shifting a boundary between the substitutable region and the unsubstitutable region to the substitutable region by L number of pixels, both in horizontal and vertical directions, L being a positive integer;
   (p2) comparing the variance with a predetermined threshold value to thereby produce a first or a second comparison signal, wherein, if the variance is greater than or equal to the predetermined threshold value, the first comparison signal is produced and, if otherwise, the second comparison signal is outputted; and
   (p3) determining the reference value according to the first or the second comparison signal, wherein the reference value in response to the first comparison signal has a smaller value than that responding to the second comparison signal.

5. The method according to claim 4, wherein the variance is determined as:

$$\sigma_D^2 = \frac{1}{K} \sum_{i=1}^{K} (D_i - \overline{D_M})^2$$

wherein $\sigma_D^2$ represents the variance of pixel values; $D_i$ denotes a pixel value included in the boundary region; $\overline{D_M}$ is a mean value of the pixel values contained in the boundary region; and K is the number of pixels within the boundary region.

6. The method according to claim 5, wherein the step (d2) includes the steps of:
   (d21) finding a part of the current frame covering the unsubstitutable region;
   (d22) dividing said part of the current frame into a plurality of search blocks, each of the search blocks having a multiplicity of pixel;
   (d23) performing the block matching technique for the search blocks based on the reference frame to thereby detect pixel values corresponding to the search blocks; and (d24) producing the second predicted current frame signal by combining the substitutable region and the pixel values for the search blocks corresponding to the unsubstitutable region.

7. The method according to claim 6, wherein each of the search blocks is defined as an equal-sized block containing H×V pixel values with H and V being positive integers, respectively.

8. An apparatus, for use in an image signal encoding system, for generating a predicted current frame signal based on a current frame and a reference frame, wherein the current and the reference frames are included in an image signal having a sequence of frames, which comprises:

means for detecting a panning vector representing a spatial displacement between the current and the reference frames;

means for determining a predicted frame containing a substitutable region and an unsubstitutable region based on the panning vector and the reference frame, wherein the substitutable region has pixel values selected from the reference frame and the unsubstitutable region has none of pixel values;

means for providing selection information by comparing a reference value with an amplitude of the panning vector;

means for generating a first predicted current frame signal by padding pixel values within the substitutable region into the unsubstitutable region within the predicted frame;

means for producing a second predicted current frame signal by using a block matching technique for the unsubstitutable region based on the panning vector and the current and reference frame signals; and means for selecting, in response to the selection information, either the first predicted current frame signal or the second predicted current frame signal as the predicted current frame signal.

9. The apparatus as recited in claim 8, wherein, when the current frame is a P or predictive frame, the current frame is predicted from its previous frame as the reference frame.

10. The apparatus as recited in claim 8, wherein, when the current frame is a B or bidirectionally predictive frame, the current frame is predicted from its previous and future frames as the reference frame and the panning vector detecting means includes:

means for detecting a forward displacement vector representing a spatial displacement between the current frame and its previous frame;

means for finding a backward displacement vector representing a spatial displacement between the current frame and its future frame; and means for providing the displacement vector corresponding to the frame having a smaller error as the panning vector, wherein an error for the previous or the future frame is defined as the mean absolute error or mean square error which is used to carry out a similarity measurement between the current frame and the previous or the future frame.

11. The apparatus as recited in claim 8, wherein the selection information providing means includes:

means for calculating a variance of pixel values included in a boundary region within the substitutable region, wherein the boundary region represents a gap between the substitutable region and a region which is formed by shifting the boundary between the substitutable region and the unsubstitutable region to the substitutable region by L number of pixels, L being a positive integer;

means for comparing the variance with a predetermined threshold value to thereby produce a first or a second comparison signal, wherein, if the variance is greater than or equal to the predetermined threshold value, the first comparison signal is produced and, if otherwise, the second comparison signal is outputted;

means for determining the reference value based on the first or the second comparison signal; and means for comparing the reference value with the amplitude of the panning vector to thereby provide the selection information.

12. The apparatus as recited in claim 11, wherein the variance is determined as:

$$\sigma_D^2 = \frac{1}{K} \sum_{i=1}^{K} (D_i - \overline{D_M})^2$$

wherein $\sigma_D^2$ represents the variance of pixel values; $D_i$ denotes a pixel value included in the boundary region; $\overline{D_M}$ is a mean value of the pixel values contained in the boundary region; and K is the number of pixels within the boundary region.

13. The apparatus as recited in claim 12, wherein the reference value in response to the first comparison signal is determined to be smaller than that of the second comparison signal.

14. The apparatus as recited in claim 13, wherein the second predicted current frame signal producing means includes:

means for finding a part of the current frame covering the unsubstitutable region;

means for dividing the unsubstitutable region into a plurality of search blocks, each of the search blocks having a multiplicity of pixel;

means for performing the block matching technique for the search blocks based on the reference frame to thereby detect pixel values corresponding to the search blocks; and means for producing the second predicted current frame signal by combining the substitutable region and the pixel values for the search blocks corresponding to the unsubstitutable region.

15. The apparatus as recited in claim 14, wherein each of the search blocks is defined as an equal-sized block containing H×V pixel values with H and V being positive integers, respectively.

16. The apparatus as recited in claim 15, wherein the selection information contains a first or a second selection signal, the first predicted current frame signal being selected in response to the first selection signal which is produced if the amplitude of the panning vector is greater than or equal to the reference value and the second predicted current frame signal being chosen responsive to the second selection signal which is generated if the amplitude of the panning vector is smaller than the reference value.

* * * * *